(12) United States Patent
Ishii

(10) Patent No.: US 8,712,928 B2
(45) Date of Patent: Apr. 29, 2014

(54) INFORMATION PROCESSING APPARATUS AND UPDATE INFORMATION OBTAINMENT METHOD

(75) Inventor: Kenji Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1114 days.

(21) Appl. No.: 12/702,611

(22) Filed: Feb. 9, 2010

(65) Prior Publication Data

US 2010/0138371 A1    Jun. 3, 2010

Related U.S. Application Data

(63) Continuation of application No. PCT/JP2007/065617, filed on Aug. 9, 2007.

(51) Int. Cl.
*G06F 15/18* (2006.01)
*G06N 99/00* (2010.01)

(52) U.S. Cl.
USPC .............................. 706/12; 709/203; 386/239

(58) Field of Classification Search
None
See application file for complete search history.

(56) References Cited

U.S. PATENT DOCUMENTS

2010/0157872 A1*  6/2010  Hyun et al. ................... 370/312

FOREIGN PATENT DOCUMENTS

| JP | 10-187563 A | 7/1998 |
|---|---|---|
| JP | 2001-125773 A | 5/2001 |
| JP | 2003-271494 A | 9/2003 |
| JP | 2003271494 | * 9/2003 |

OTHER PUBLICATIONS

International Search Report of PCT/JP2007/065617, mailing date of Nov. 20, 2007.
Japanese Office Action dated Sep. 11, 2012, issued in corresponding Japanese patent application No. 2009-526311, W/ English translation.

* cited by examiner

*Primary Examiner* — Jeffrey A Gaffin
*Assistant Examiner* — Kalpana Bharadwaj
(74) *Attorney, Agent, or Firm* — Westerman, Hattori, Daniels & Adrian, LLP

(57) ABSTRACT

An information processing apparatus includes an obtainment section that obtains, via a network, information updated at a distribution origin on the network; and a determination section that determines an obtainment rule relating to a timing of the obtainment by the obtainment section of update information for the distribution origin, wherein the obtainment section obtains update information based on a predetermined learning rule for a first distribution origin for which obtainment rule has not been determined by the determination section, the determination section determines an obtainment rule for the first distribution origin based on a result of the obtainment by the obtainment section of update information from the distribution origin based on the learning rule, and the obtainment section, in response to the determination of the obtainment rule by the determination section, obtains update information from the first distribution origin based on the obtainment rule.

14 Claims, 11 Drawing Sheets

FIG. 4

| No. | FEED NAME 21a | FOLDER 21b | URL 21c | CONTENT STORAGE DESTINATION 21d | PERIODIC OBTAINMENT SETTING 22a | PERIODIC OBTAINMENT RULE 22b | OBTAINMENT TIMING 22c | UPDATE DATE AND TIME 22d |
|---|---|---|---|---|---|---|---|---|
| 1 | Movie news | News | http://eiga.xxx.yyy/eiga.rss | d:¥001¥eiga.rss | YES | COMPLIANCE RULE 1 | 12:00 DAILY | 2007/4/5 11:45 |
| 2 | Sports news | News | http://sports.news.yyy/spr.rss | d:¥002/spr.rss | YES | COMPLIANCE RULE 4 | 12:00 DAILY 20:00 DAILY | 2007/4/5 18:29 |
| 3 | ABCblog | blog | http://blog.abc.yyy/blog.rss | d:¥003/blog.rss | NO | — | — | — |
| 4 | PCshop | shopping | http://www.pcshopX.yyy.jp/news.rss | d:¥004/news.rss | YES | LEARNING | 0:00 DAILY 4:00 DAILY 8:00 DAILY 12:00 DAILY 16:00 DAILY 20:00 DAILY | 2007/4/5 10:25 |
| 5 | Mshop | shopping | http://www.mXYZ01.zz.jp/news.rss | d:¥005/chirashi.rss | YES | FIXED SETTING | 12:00 DAILY | 2007/4/5 11:30 |

FIG. 6

| No. | COMPLIANCE RULE | SETTING TIMING | RELEARNING RULE |
|---|---|---|---|
| 1 | UPDATE ONCE DAILY | FOUR-HOUR UNIT TIME CORRESPONDING TO THE LATEST UPDATE TIME WITHIN UPDATE DATA | FOUR-HOUR UNIT TIME DAILY, 20 TIMES |
| 2 | UPDATE ONCE DAILY EXCEPT FOR SATURDAYS, SUNDAYS, AND HOLIDAYS | FOUR-HOUR UNIT TIME CORRESPONDING TO THE LATEST UPDATE TIME WITHIN UPDATE DATA | FOUR-HOUR UNIT TIME DAILY, 20 TIMES |
| 3 | UPDATE MORE THAN ONCE DAILY | FOUR-HOUR UNIT TIME CORRESPONDING TO UPDATE TIME WITHIN UPDATE DATA | FOUR-HOUR UNIT TIME DAILY, 20 TIMES |
| 4 | UPDATE MORE THAN ONCE DAILY EXCEPT FOR SATURDAYS, SUNDAYS, AND HOLIDAYS | FOUR-HOUR UNIT TIME CORRESPONDING TO UPDATE TIME WITHIN UPDATE DATA | FOUR-HOUR UNIT TIME DAILY, 20 TIMES |
| 5 | UPDATE ONCE ON THE SAME DAY EVERY WEEK | FOUR-HOUR UNIT TIME CORRESPONDING TO THE LATEST UPDATE TIME ON THE SAME DAY EVERY WEEK | FOUR-HOUR UNIT TIME DAILY, 10 TIMES |
| 6 | UPDATE ONCE WEEKLY | FOUR-HOUR UNIT TIME CORRESPONDING TO THE LATEST UPDATE TIME WITHIN UPDATE DATA ON THE LATEST DAY | FOUR-HOUR UNIT TIME DAILY, 10 TIMES |
| 7 | UPDATE TWICE WEEKLY | FOUR-HOUR UNIT TIME CORRESPONDING TO THE LATEST UPDATE TIME WITHIN UPDATE DATA ON EVERY CORRESPONDING DAY OF WEEK | FOUR-HOUR UNIT TIME DAILY, 10 TIMES |
| 8 | OTHER (FIXED SETTING) | AT 12:00 ON MONDAYS | FOUR-HOUR UNIT TIME DAILY, 10 TIMES |

INFORMATION PROCESSING APPARATUS AND UPDATE INFORMATION OBTAINMENT METHOD

CROSS-REFERENCE TO RELATED APPLICATION

This application is a continuation Application of a PCT international application No. PCT/JP2007/065617 filed on Aug. 9, 2007 in Japan, the entire contents of which are incorporated by reference.

FIELD

The embodiments discussed herein are related to a technique for regularly obtaining update information at a distribution origin of information on a network (for example, on the Internet).

BACKGROUND

Conventional mechanisms for information distribution on the Internet include the RSS, which represents the RDF (Resource Description Framework) Site Summary, the Rich Site Summary, and the Really Simple Syndication). In conventional information processing apparatuses, in order to obtain RSS data (RSS feed) from a distribution origin (for example, an information distribution server, such as a WWW (World Wide Web) server) of an RSS, an RSS reader executes obtainment and update processing of the RSS data on the URL (Uniform Resource Locator) of that RSS upon startup or at a periodic timing set by the user.

Note that, in recent years, in addition to RSSs being used for distribution of update information in a web log, the latest news on news distribution sites, or program information of radio or TV programs, or press release or new product information and support information from various corporations are distributed on the Internet as headline information using RSSs.

Since RSSs are often periodically update and distributed, automatically obtaining RSSs at update timing are desired.

Note that, conventionally, in order for an information processing apparatus to efficiently upgrade device drivers for peripheral devices, such as all-in-one printers, a technique is used in which an interval (update scheduled time) for checking version information of the device driver next time is received from a management server when the peripheral device inquires the management server of device drivers via a network (see the following Patent Reference 1, for example).

Patent Document 1: Japanese Laid-Open Patent Application No. 2001-125773

Broadband, flat-rate Internet services for personal computers or the like (for example, broadband services in the present Japan) employ wired networks, and charges for the band (network) to the user do not present an issue even when RSS data is updated (obtained) by polling periodically at a short interval (for example, every five minutes) for obtaining the RSS data that are just updated.

However, wireless networks used by mobile telephones, personal digital assistants (PDAs), for example, have a variety of restrictions compared to wired networks.

For example, the user may be charged with a higher communication fee if communications are carried out (employed) more frequently, and wireless networks are more susceptible to troubles (such as communication failures) due to network overload.

More specifically, since communication fees may be charged for every inquiry from a mobile terminal in a pull-type communication, the user may be charged with an expensive communication when polling periodically at a short interval for obtaining the RSS data that is just updated.

Furthermore, since wireless networks are more susceptible to troubles due to overload than wired networks, communications may be failed if a lot of mobile terminals periodically poll to the same URL or the same WWW server at short intervals.

In addition, since the capacity of batteries of mobile terminals is limited, a significant battery capacity may be consumed by periodical polling at a shorter interval. For example, since mobile telephones can carry out communications for two to three times using a single battery, the battery only lasts 15 hours if obtainment processing of RSS data is carried out every five minutes, by a mailer in a personal computer, for example.

For the above reasons, for obtaining RSS data, it is desirable to efficiently obtain updated RSS data with minimum inquiries, particularly in the case of mobile terminals.

Note that the technique described in the above Patent Reference 1 must provide a function in which a distribution origin of information notifies of the next scheduled update time, and is not a technique for facilitating efficient obtainment of information by a user terminal that is a distribution destination of information.

SUMMARY

According to an aspect of the embodiment, the information processing apparatus includes an obtainment section that obtains, via a network, information updated at a distribution origin on the network; and a determination section that determines an obtainment rule relating to a timing of the obtainment by the obtainment section of update information for the distribution origin; wherein the obtainment section obtains update information on the basis of a predetermined learning rule for a first distribution origin for which obtainment rule has not been determined by the determination section, the determination section determines an obtainment rule for the first distribution origin on the basis of a result of the obtainment by the obtainment section of update information from the distribution origin on the basis of the learning rule, and the obtainment section, in response to the determination of the obtainment rule by the determination section, obtains update information from the first distribution origin on the basis of the obtainment rule.

In addition, according to an aspect of the embodiment, an update information obtainment method that obtains, via a network, information updated at a distribution origin on the network, the method includes performing a learning obtainment that obtains update information from the distribution origin on the basis of a predetermined learning rule; performing a determination that determines an obtainment rule relating to an obtainment timing of update information for the distribution origin on the basis of a result of the obtainment at the learning obtainment of update information from the distribution origin; and performing a first normal obtainment that obtains update information from the distribution origin on the basis of the obtainment rule determined at the determination.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 4 is a diagram illustrating feed information and setting information stored in a storage section in an information processing apparatus as one embodiment;

FIG. 6 is a diagram illustrating table relating to a plurality of rules stored in an information processing apparatus as one embodiment;

DESCRIPTION OF EMBODIMENTS

Hereinafter, embodiments will be described with reference to the drawings.

(1) Description of One Embodiment

First, the configuration of an information processing apparatus as one embodiment (hereinafter, referred to as an "information processing apparatus") will be described with reference to the block diagram depicted in FIG. 1.

Figure 1:
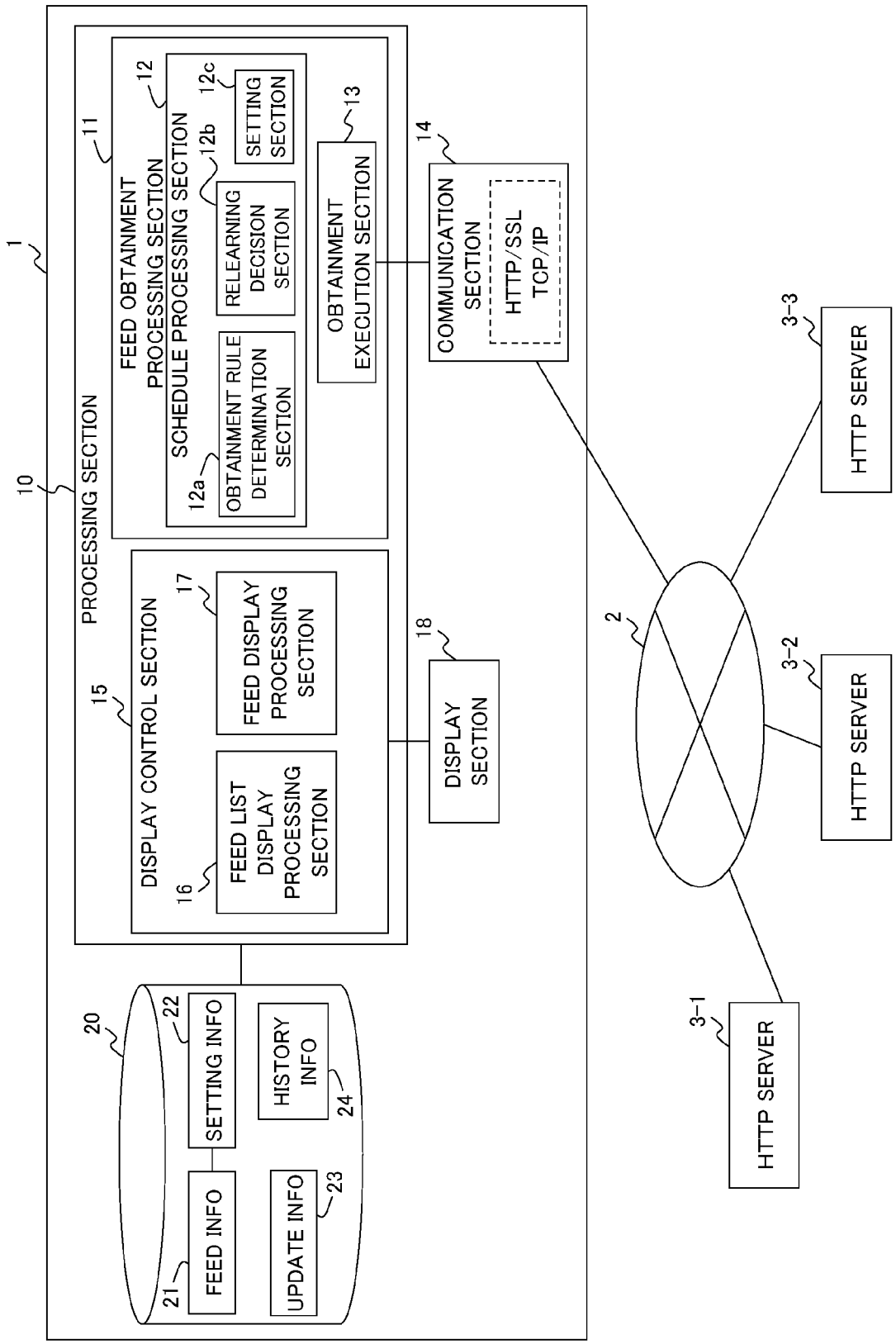
FIG. 1 is a block diagram illustrating the configuration of an information processing apparatus as one embodiment.

As depicted in FIG. 1, the information processing apparatus 1 is configured to be connected to a plurality of servers (HTTP (HyperText Transfer Protocol) servers in this example) 3-1 to 3-3 via a communication network 2, and to include a processing section 10, a communication section 14, a display section 18, and a storage section 20.

Figure 2:
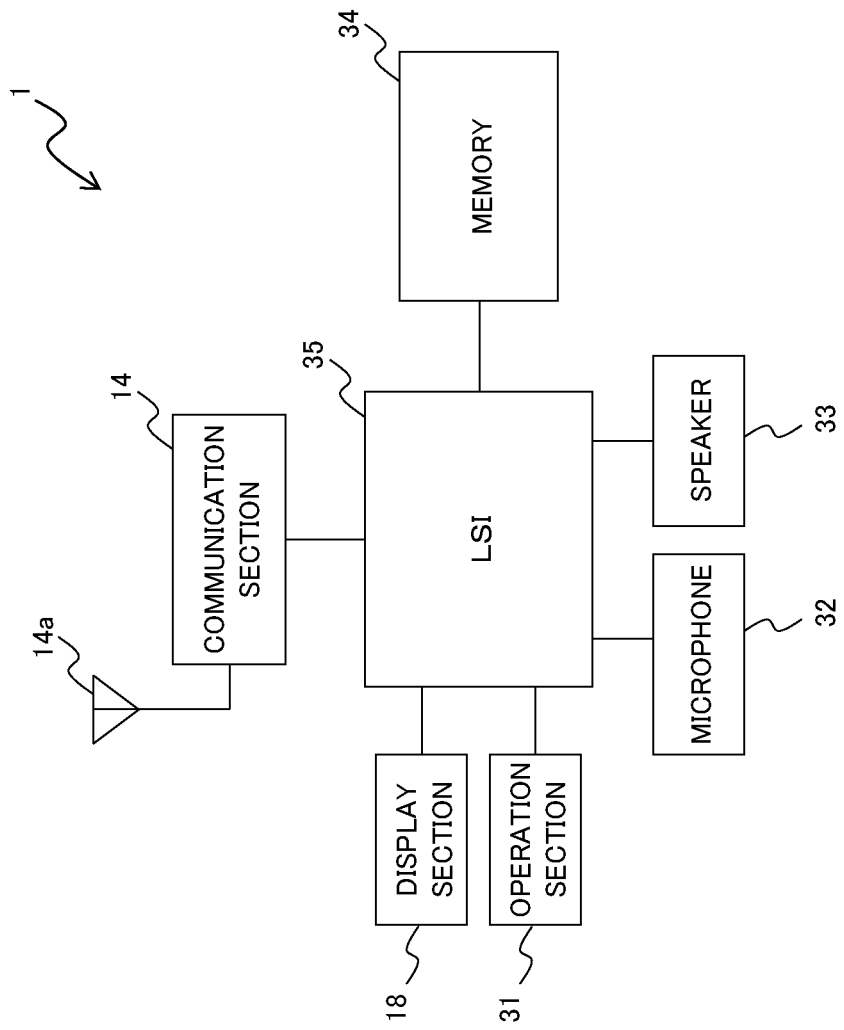
FIG. 2 is a block diagram illustrating one example of the hardware configuration of an information processing apparatus as one embodiment.

More specifically, the information processing apparatus 1 may be a mobile terminal, for example, and includes the communication section 14, the display section (display) 18, an operation section (operation buttons) 31, a microphone 32, a speaker 33, a memory 34, and an LSI (Large Scale Integration) 35 as hardware components as depicted in FIG. 2.

Note that the LSI 35 is connected to the communication section 14, the display section 18, the operation section 31, the microphone 32, the speaker 33, and a memory 34. In addition, the communication section 14 includes an antenna 14a.

The processing section 10 (a feed obtainment processing section 11 and a display control section 15 that will be described later) is embodied by the LSI 35 executing a predetermined application program (an update information obtainment program that will be described later). Note that the LSI 35 executes sound processing related to the microphone 32 and the speaker 33, and communication processing (for example, baseband processing) related to the communication section 14.

Furthermore, the storage section 20 is embodied by the memory 34. The memory 34 is constructed from a flash memory or an SRAM (static random access memory) device, for example.

Figure 3:
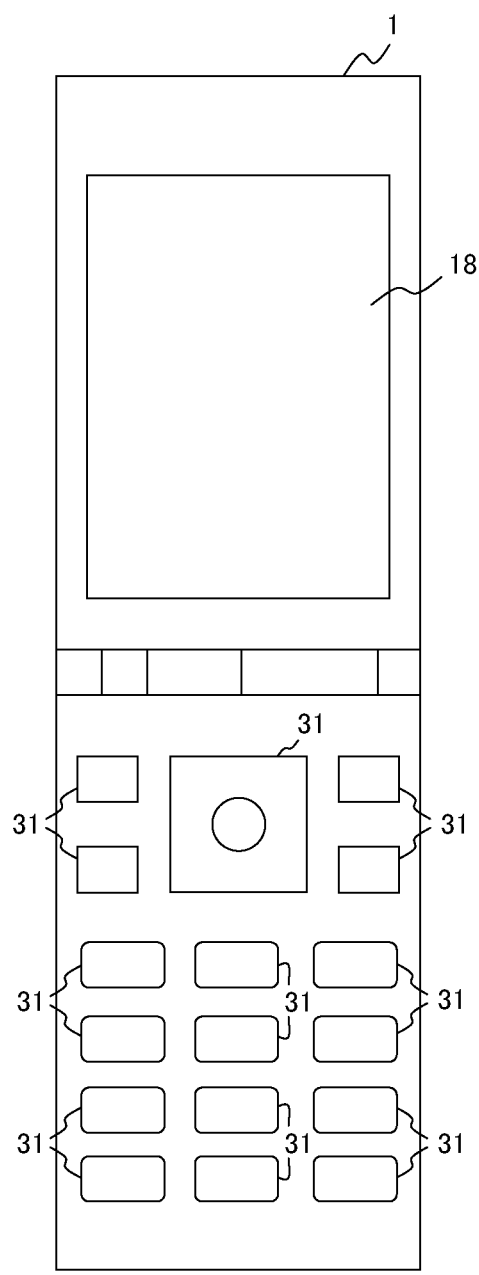
FIG. 3 is a block diagram illustrating one example of the outer appearance of an information processing apparatus as one embodiment.

In addition, the mobile terminal as the information processing apparatus 1 is a mobile telephone, and the mobile telephone as the information processing apparatus 1 is configured to enable operation of a plurality of operation sections (operation buttons) 31 as the user interface while the user is viewing the display 18, as depicted in FIG. 3.

The processing section 10 is configured to include the feed obtainment processing section 11 and the display control section 15.

The feed obtainment processing section 11 is adapted to obtain update information (RSS feed (RSS data)) from a predetermined URL (Uniform Resource Locator) of HTTP servers (WWW (World Wide Web) servers) 3-1 to 3-3 (hereinafter, they are simply refereed to using reference numeral "3" when no distinction among them is needed) which are distribution origins of information on the network 2. The feed obtainment processing section 11 is configured to include a schedule processing section 12 that determines an obtainment rule of update information and register it in the storage section 20, and an obtainment execution section (obtainment section) 13 that obtains update information from the URL on the basis of an obtainment rule stored in the storage section 20. Note that obtainment execution section 13 obtains update information from the distribution origin using the communication section 14 that executes communications (communications using the HTTP/SSL (Secure Sockets Layer), the TCP/IP (Transmission Control Protocol/Internet Protocol)) via network 2.

In addition, the display control section 15 is adapted to display feed names (list), actual feed data (for example, content data), and the like related to the update information on the display section 18.

Furthermore, the storage section 20 is adapted to store feed information 21 related to distribution origin or update information periodically obtained by the feed obtainment processing section 11, setting information 22 related to periodic obtainments of respective feed information, obtained update information (RSS feed) 23, and history information 24 indicating obtainment history.

Note that the feed information 21 in the storage section 20 is registered by an obtainment rule determination section (determination section) 12a or a setting section 12c in the schedule processing section 12 which will be described below, and the setting information 22 is registered by the obtainment rule determination section 12a and the setting section 12c.

More specifically, as depicted in FIG. 4, the storage section 20 stores a feed name 21a, a folder 21b, a URL 21c, and a content storage destination 21d as the feed information 21.

That is, the feed information 21 includes, for each feed name 21a as the name of RSS data that is to be periodically obtained, a folder 21b for managing the name in the hierarchical structure, a URL 21c that is the distribution origin of the RSS data (i.e., the address of a storage destination of the update information 23 in the storage section).

The information 21a-21d is registered by the obtainment rule determination section 12a or the setting section 12c in accordance with an instruction from the user which is input through the operation section 31.

In addition, the setting information 22 includes a periodic obtainment setting 22a that indicates whether or not periodical obtainment is executed for each feed name 21a in the feed information 21, a periodic obtainment rule 22b indicating a rule for periodic obtainment, an obtainment timing 22c indicating a specific timing of the periodic obtainment, and an update date and time 22d of the latest update information obtained.

Note that the periodic obtainment setting 22a is registered by the setting section 12c in accordance with an instruction from the user which is input through the operation section 31, the periodic obtainment rule 22b and the obtainment timing 22c are registered by the obtainment rule determination section 12a, and the update date and time 22d is registered by the obtainment execution section 13.

More specifically, "YES" or "NO" is set by the setting section 12c to the periodic obtainment setting 22a on the basis of an instruction from the user. In addition, the periodic obtainment rule 22b is set to one of "compliance rule Nos. 1 to 8" that will be described later (see FIG. 6 that will be described later), or "LEARNING" or "FIXED SETTING" by the obtainment rule determination section 12a.

Note that the update information 23 and the history information 24 stored in the storage section 20 will be described below with reference to FIG. 7 and FIG. 5, respectively.

Next, details of the obtainment execution section 13 in the feed obtainment processing section will be described.

The obtainment execution section 13 is adapted to obtain information updated at an HTTP server 3 via the network 2 using the communication section 14.

The obtainment execution section 13 accesses a URL 21c of feed information 21 stored in the storage section 20 (i.e., a predetermined URL of a predetermined HTTP server 3) on the basis of a periodic obtainment rule 22b in setting information 22 stored in the storage section 20 (specifically, on the basis of the time represented by the obtainment timing 22c), and obtains update information (RSS feed) from that URL.

For example, as depicted in FIG. 4, for a feed having a feed name 21a "Movie News," the obtainment execution section 13 accesses a URL represented by the URL 21c according to compliance rule 1, specifically 12:00 everyday, and executes update processing for obtaining update information.

In addition, the obtainment execution section 13 executes update processing on a URL for a feed having the feed name 21a "Sports News" according to compliance rule 4, specifically 12:00 and 20:00 each day.

Furthermore, the obtainment execution section 13 obtains update information on the basis of a predetermined learning rule that is preset for URLs, the feed information 21 of which is stored in the storage section 20 and periodic obtainment setting 22a of which in setting information 22 is set to "YES" but periodic obtainment rule 22b has not been determined yet.

For example, for feeds that has been just registered in the storage section 20 and no periodic obtainment rule has been determined therefor yet, specifically a distribution origin having a feed name 21a of "PC Shop" in FIG. 4, the obtainment execution section 13 execute update information obtainment processing on the basis of a preset learning rule (in this example, a rule that periodically executes update processing (polling) at four-hour interval from 0:00 everyday until update information is obtained 20 times).

A corresponding periodic obtainment setting 22a is set to "YES," the periodic obtainment rule 22b is set to "LEARNING," and the obtainment timing 22c is set to "0:00 DAILY, 4:00 DAILY, 8:00 DAILY, 12:00 DAILY, 16:00 DAILY, 20:00 DAILY."

Figure 5:
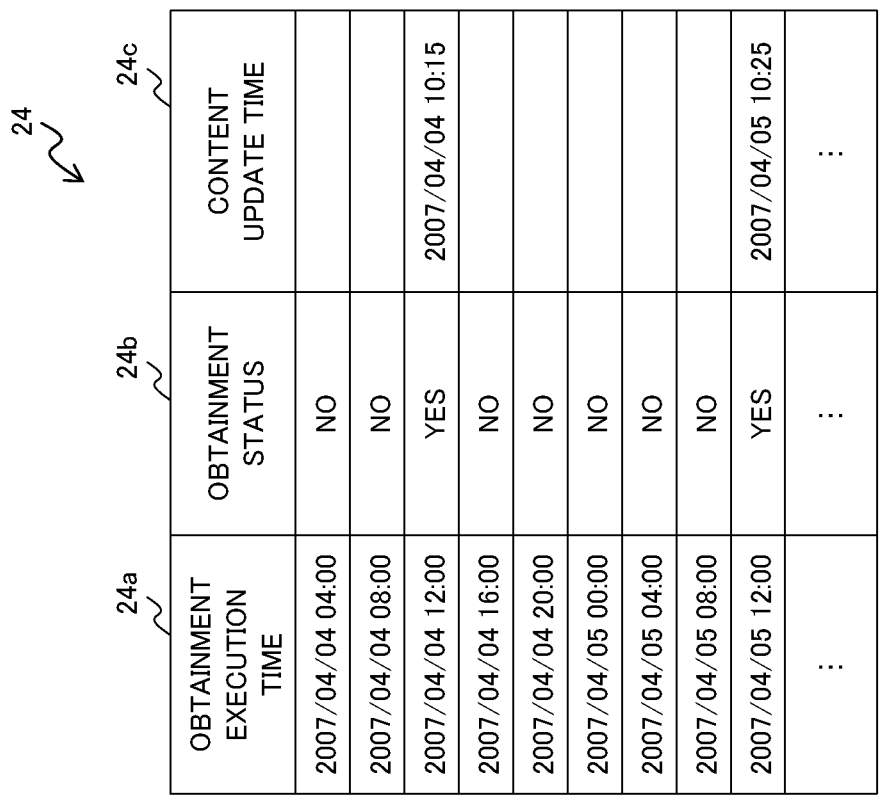
FIG. 5 is a diagram illustrating history information stored in a storage section in an information processing apparatus as one embodiment.

The obtainment execution section 13 then registers results of update processing during the learning period, as the history information 24 to the storage section 20, as depicted in FIG. 5, for example.

That is, the obtainment execution section 13 registers the result ("YES" or "NO") for each time when update processing is executed (obtainment execution time 24a) as obtainment status 24b, and registers update time (content update time) 24c at the distribution origin of obtained update information if update information can be obtained (i.e., when the obtainment status is set to "YES").

Note that an update time (time) of update information that is to be registered in the update time 24c is attached to update information, for example.

Here, history information 24 in the storage section 20 depicted in FIG. 5 is stored by being related to a distribution origin (feed information 21 in FIG. 4). The obtainment execution section 13 then determines availability of update information in history information 24 on the basis of a date and time when previously obtained update information is updated at the distribution origin.

More specifically, the obtainment execution section 13 registers update date and time of the latest update information to update date and time 22d as the setting information 22, and upon executing obtainment processing of update information, makes the communication section 14 to issue an HTTP request in which the update date of update information (RSS data; for example, content data) is set to "If-Modified-Since.".

Thereby, if update information having a date and time that is newer than the date and time that is set to the update date and time 22d is present in distribution origin, the obtainment execution section 13 obtains the update information.

Upon this, the obtainment execution section 13 sets an obtainment status 24b of the history information 24 to "YES," and registers the date and time when the obtained update information was updated at the distribution origin to content update time 24c.

Furthermore, the obtainment execution section 13 registers the date and time when the obtained update information was updated at the distribution origin to update date and time 22d of the setting information 22 by overwriting it.

On the other hand, if update information having a date and time that is newer than the date and time that is set to the update date and time 22d is not available in distribution origin, the obtainment execution section 13 does not obtain update information.

The obtainment execution section 13 set obtainment status 24b in the history information 24 to "NO," and no registration is made to content update time 24c.

Note that the storage section 20 stores not only a update processing result in accordance with a learning rule by the obtainment execution section 13, but also obtains the result of update processing when normal operation by the obtainment execution section 13 (that is, when operating on the basis of the obtainment rule determined by the obtainment rule determination section 12a) as history information 24.

In addition, information indicating whether the history information 24 is originated from initial learning, relearning, or a normal operation may be additionally provided to respective history information 24, the schedule processing section 12 may determine processed time of the history information 24 on the basis of such information.

Furthermore, the history information 24 is configured to, upon learning or relearning, stores 20 update processing results, and deletes the oldest update if the number of processing results exceeds 20. This helps to save hardware resources.

In addition, the obtainment execution section 13 also executes update processing in accordance with a preset relearning rule that is determined by the obtainment rule determination section 12a upon relearning that will be described later, which will be explained below when describing a relearning decision section (decision section) 12b.

Figure 9:
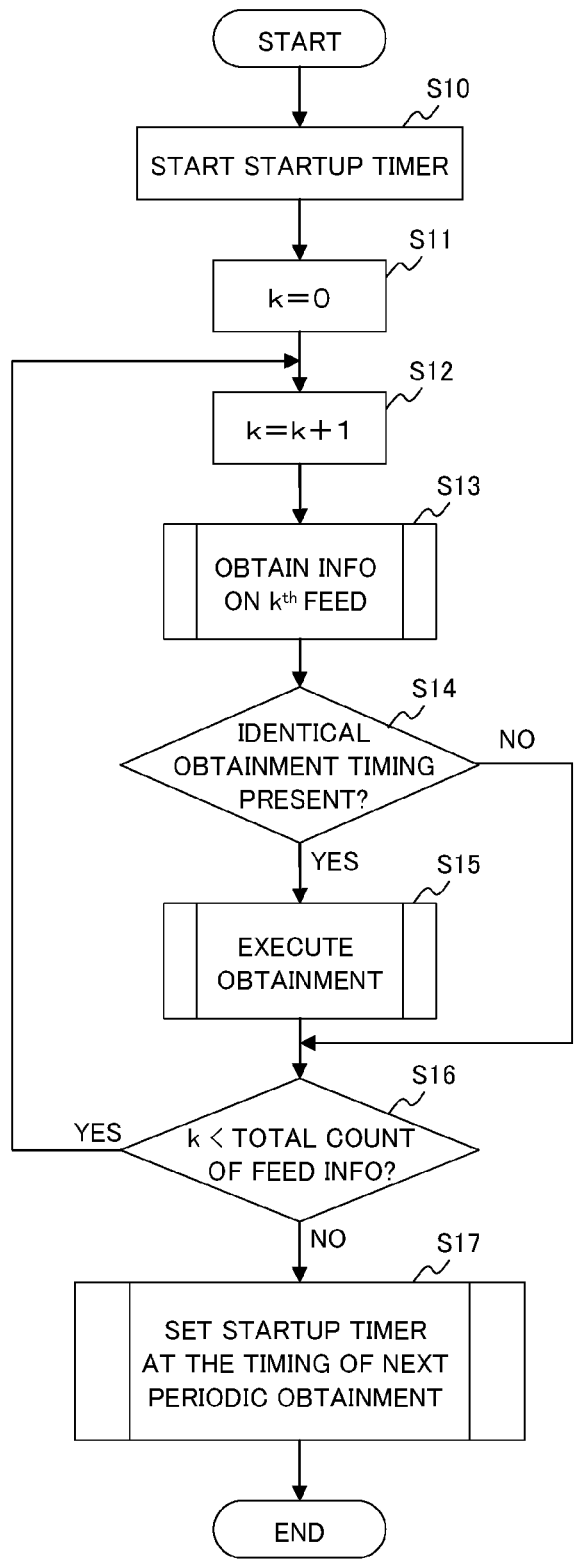
FIG. 9 is a flowchart illustrating the operation procedure of an obtainment execution section in a feed obtainment processing section in the processing section in an information processing apparatus as one embodiment.

Note that a more specific operation procedure of the obtainment execution section 13 (processing procedure for a plurality of distribution origins) will be described with reference to FIG. 9 that will be described later.

Next, details of the schedule processing section 12 (i.e., the obtainment rule determination section 12a, the relearning decision section 12b, and the setting section 12c) will be described.

The obtainment rule determination section 12a is adapted to determine an obtainment rule for a distribution origin on the basis of an obtainment result of update information from the distribution origin on the basis of a learning rule by the obtainment execution section 13, i.e., the history information 24 in the storage section 20.

More specifically, the obtainment rule determination section 12a is adapted to identify a rule corresponding to history information 24 from a plurality of rules stored in table 12d depicted in FIG. 6 as an obtainment rule, and selects a rule corresponding to history information 24 when learning from a plurality of compliance rules 12e in the table 12d in FIG. 6, and on the basis of the obtainment rule the selected compliance rule 12e and a setting timing 12f corresponding to the compliance rule 12e.

Furthermore, the obtainment rule determination section 12a searches for a compliance rule 12e corresponding to the history information 24 when learning sequentially from Number (No.) 1 to 8 registered in the table 12d, and, in response to matching, determines an obtainment rule on the basis of the compliance rule 12e.

Here, in the table 12d, priorities are set in advance for a plurality of compliance rules 12a. In the example of FIG. 6, priorities are set such that the priority of the compliance rule "No. 1" is the highest, and priorities are reduced, the compliance rule "No. 8" having the lowest.

Accordingly, the obtainment rule determination section 12a is configured to search a plurality of rules for a rule corresponding to history information 24 in order of priority set for a plurality of rules, and, when a corresponding rule is found, determine that rule as an obtainment rule.

Note that the history information 24 in FIG. 5 obtains update information substantially prior to 10:30 everyday (see the content update time 24c). If this situation continues during the learning period (i.e., until the update information is obtained 20 times), on the basis of an obtainment result for updating substantially prior to 10:30 once everyday, the obtainment rule determination section 12a searches for Compliance Rule No. 1 of "UPDATE ONCE DAILY," and the next four-hour unit time corresponding to the latest update time within obtained update data (update information) (i.e., the update time among content update times 24a; 10:25 in this case), that is, 12:00 in this case, is set as a setting timing. As a result, the obtainment rule determination section 12a identifies an obtainment rule for obtaining at 12:00 everyday.

As for details of the method of determining an obtainment rule by the obtainment rule determination section 12a, for obtainment rules obtained by the obtainment rule determination section 12a, similar to learning rules, the information processing apparatus 1, is preset to execute update processing at one of times of 0:00, 4:00, 8:00, 12:00, 16:00, and 20:00, which are times when a single day is divided into units of four hours.

Accordingly, the obtainment rule determination section 12a, on the basis of the update processing result in the learning period, in order to ensure that update information of a regular update when there is a regular update is obtained, determines, as time to execute update processing, the four-hour unit time (one of times 0:00, 4:00, 8:00, 12:00, 16:00, and 20:00) immediately after the latest time in one rule unit among regular updates.

In other words, the obtainment rule determination section 12a determines a rule of 4:00 as an obtainment time if update information is periodically obtained between 0:00 and 4:00. In addition, the obtainment rule determination section 12a determines a rule of 8:00 as an obtainment time if update information is periodically obtained between 4:00 and 8:00. Similarly, the obtainment rule determination section 12a determines a rule of 12:00, 16:00, 20:00, or 0:00 as an obtainment time if update information is periodically obtained between 8:00 and 12:00, between 12:00 and 16:00, between 16:00 and 20:00, or between 20:00 and 0:00, respectively.

For example, if Compliance Rule No. 3 in the table 12d is satisfied and update information is obtained around 10:30 and around 16:30 each day, the obtainment rule determination section 12a sets an update around 10:30 and an update around 16:30, as one rule unit, and determines an obtainment rule as an obtainment time of the four-hour unit time immediately after the latest time of update information around 10:30 (12:00 in this example), and the four-hour unit time immediately after the latest time of update information around 16:30 (16:00 in this example).

As for compliance rules 12e and setting timings 12f following Compliance Rule No. 1 in the table 12d depicted in FIG. 6, Compliance Rule No. 2 is the case where update is executed once each day, except for Saturdays, Sundays, and holidays. If this compliance rule is satisfied, the obtainment rule determination section 12a adapts an obtainment rule for executing update processing at a four-hour unit time corresponding to the latest update time within the update information each day, except for Saturdays, Sundays, and holidays.

In addition, Compliance Rule No. 3 is the case where update is executed twice or more frequently each day, and in this case, the obtainment rule determination section 12a adapts an obtainment rule for executing update processing at a four-hour unit time corresponding to the latest update time for each rule unit.

Furthermore, Compliance Rule No. 4 is the case where update is executed twice or more frequently each day, except for Saturdays, Sundays, and holidays everyday. In this case, the obtainment rule determination section 12a, similar to the relationship of Rule No. 2 with respect to Rule No. 1, with respect to Rule No. 3, adapts an obtainment rule for executing update processing at times determined similar to Rule No. 3 between Monday and Friday, and executing no update processing on Saturdays, Sundays, and holidays.

In addition, Compliance Rule No. 5 is the case where update is executed once on a particular day in week, and in this case, the obtainment rule determination section 12a identifies that day, and adapts an obtainment rule for executing update processing at a four-hour unit time corresponding to the latest update time on that day in week in each week.

Furthermore, Compliance Rule No. 6 is the case where update is executed once each week. In this case, the obtainment rule determination section 12a adapts an obtainment rule for executing update processing at a four-hour unit time corresponding to the latest update time update information on the latest day from Sunday to Saturday, setting Sunday as the first day and Saturday as the last day in a week.

In addition, Compliance Rule No. 7 is the case where update is executed twice or more frequently each week, and in this case, the obtainment rule determination section 12a adapts an obtainment rule for executing update processing at a four-hour unit time corresponding to the latest update time on a day week, for each updated day (matching day).

Furthermore, Compliance Rule No. 8 is the case where none of Rules No. 1 to No. 7 is applied. In this case, the obtainment rule determination section 12a adapts a preset obtainment rule for executing update processing at 12:00 every Mondays. Note that the obtainment rule in this case can be set by the setting section 12c.

In addition, the obtainment rule determination section 12a, when it is determined by the relearning decision section 12b that relearning is required (in this example, when it is determined that update information is not successfully obtained by the obtainment execution section 13), relearning rule 12g is determined on the basis of the table 12d.

That is, the relearning decision section 12b is adapted to determine whether or not relearning by the obtainment execution section 13 is required, and in this example, on the basis of an obtainment result of update information by the obtainment execution section 13 from a distribution origin on the basis of an obtainment rule determined by the obtainment rule determination section 12a (i.e., history information 24 related to update processing from a distribution origin during normal operation), the obtainment execution section 13 determines whether or not update information is successfully obtained from that distribution origin, thereby determining whether or not relearning is required.

More specifically, the relearning decision section 12b determines, on the basis of history information 24 during normal operation, that update information is not successfully obtained by the obtainment execution section 13 and thus relearning is required when the obtainment execution section 13 cannot obtain update information since no update information is available at the distribution origin.

In addition, the relearning decision section 12b, independently from the above determination of necessity of relearning (whether or not update information is obtained successfully), once a predetermined time period elapses (for example, once the obtainment execution section 13 obtains update information 20 times on the basis of the obtainment rule), determines whether or not the obtainment rule that is currently being applied is compliant with update of information at the actual distribution origin on the basis of update date and time or the like (history information 24) of update information that has been obtained up to present.

Note that specific determination technique used by the relearning decision section 12b will be described with reference to FIG. 10 that will be described later.

Then, it is determined by the relearning decision section 12b that update information is not successfully obtained by the obtainment execution section 13, or it is determined that obtainment rule does not comply with update of information at the distribution origin, the obtainment rule determination section 12a adapts relearning rule 12g that is preset corresponding to the current (normal operation during) obtainment rule 12e as a relearning rule.

That is, relearning rule determined by the obtainment rule determination section 12a is determined in accordance with the obtainment rule prior to redetermination of a relearning rule by the obtainment rule determination section 12a.

For example, when the obtainment execution section 13 currently adapts an obtainment rule corresponding to compliance rule 12e of No. 1 to 4, the obtainment rule determination section 12a adapts a relearning rule for executing update processing until update information is obtained 20 times at four-hour unit time each day (in the drawing, labeled as "FOUR-HOUR UNIT TIME DAILY, 20 TIMES"), as a corresponding relearning rule, on the basis of the table 12d.

In addition, when the obtainment execution section 13 currently adapts an obtainment rule corresponding to compliance rule 12e of No. 5 to 8, the obtainment rule determination section 12a adapts a relearning rule for executing update processing until update information is obtained 10 times at four-hour unit time each day (in the drawing, labeled as "FOUR-HOUR UNIT TIME DAILY, 10 TIMES"), as a corresponding relearning rule, on the basis of the table 12d.

As described above, the compliance rules 12e of No. 5 to 8 in which update processing is less frequent compared to the compliance rules 12e of No. 1 to 4 are set such that the obtainment count of update information for determining the learning period is smaller, and the relearning rule 12g that is preset in the table 12d is set such that effective relearning is achieved in accordance with the obtainment rule that is adapted currently.

Once a relearning rule is determined by the obtainment rule determination section 12a, the obtainment execution section 13 executes update processing in accordance with the determined relearning rule, similar to the first learning, and registers a relearning result to the storage section 20 as history information 24 (see FIG. 5).

Furthermore, once the update processing in accordance with the relearning rule by the obtainment execution section 13 ends, the obtainment rule determination section 12a redetermines an obtainment rule on the basis of an obtainment result (i.e., history information 24) of update information from the distribution origin by the obtainment execution section 13 on the basis of the relearning rule.

The redetermination of the obtainment rule by the obtainment rule determination section 12a is carried out on the basis of the table 12d, as in the case of the determination method of the initial obtainment rule (upon the initial setting).

Once the obtainment rule is redetermined by the obtainment rule determination section 12a, the obtainment execution section 13 obtains update information from the distribution origin on the basis of that redetermined obtainment rule.

The setting section 12c is adapted to configure various settings in accordance with an instruction from the user via the operation section 31, for example, to configure a feed name 21a and a folder 21b of feed information 21, and a periodic obtainment setting 22a of setting information 22 in accordance with an instruction from the user in order to specify update information of which HTTP server 3 (site) is to be periodically obtained.

In addition, the setting section 12c sets the order (No.) of each compliance rule 12e in the table 12d, i.e., the priority of each compliance rule 12e, in accordance with an instruction from the user. That is, the setting section 12c sets the priority used by the obtainment rule determination section 12a to search a plurality of rules (compliance rules 12e and corresponding setting timings 12f) for a rule corresponding to an obtainment result by the obtainment execution section 13.

Furthermore, the setting section 12c can also set a different setting timing 12f ("AT 12:00 ON MONDAY" in FIG. 6) (fixed setting) for a compliance rule 12e in accordance with an instruction from the user.

Note that the setting section 12c may set and change a relearning rule 12g in accordance with an instruction from the user.

Next, with regard to the display control section 15, the display control section 15 is adapted to control the display on the display section 18, and is configured to include a feed list display control section 16 and a feed display control section 17.

Figure 7:
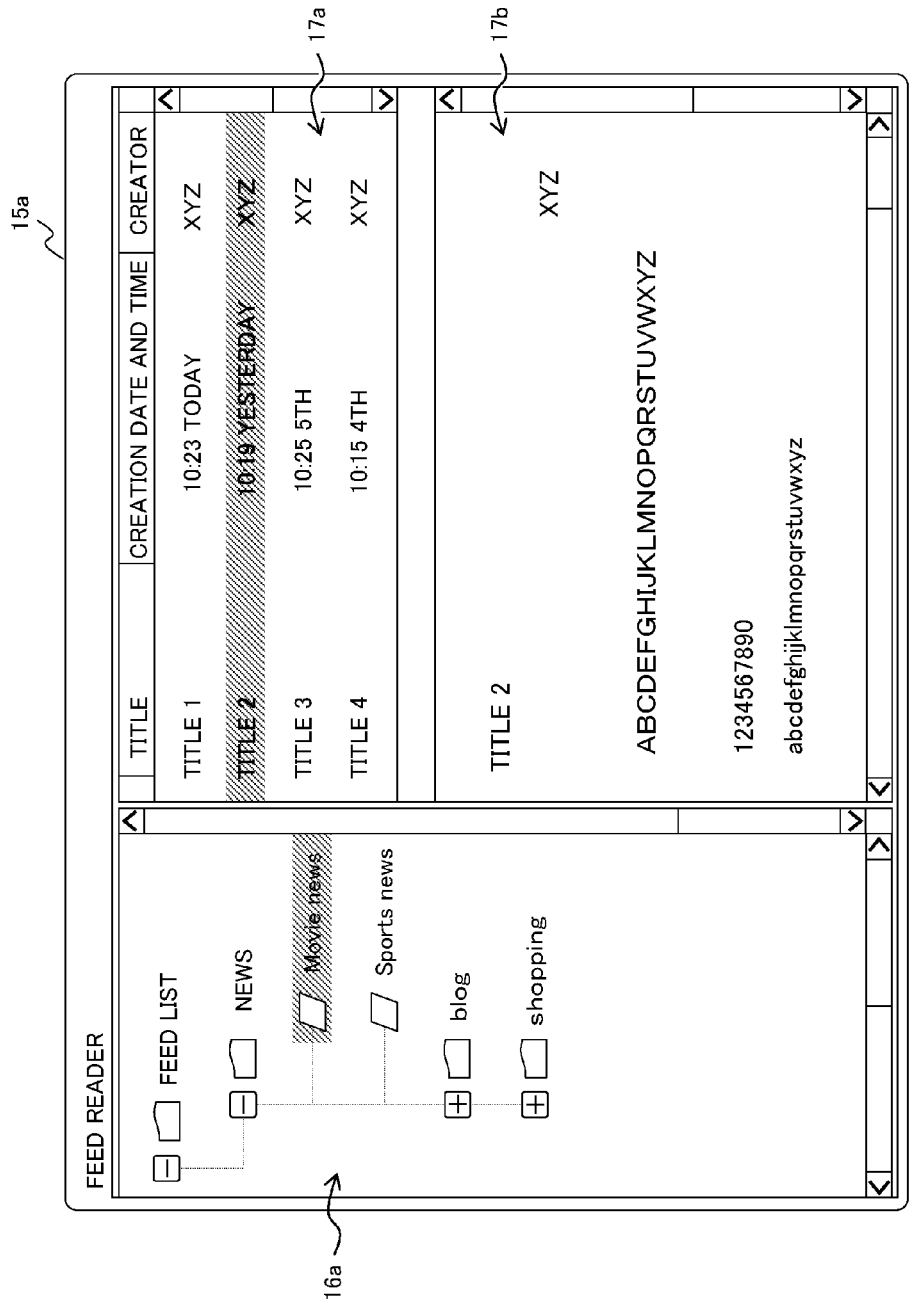
FIG. 7 is a diagram illustrating one example of a feed display screen displayed on a display section by a display control section in a processing section in an information processing apparatus as one embodiment.

Here, FIG. 7 depicts a feed display screen 15a displayed on the display section 18 by the display control section 15, the feed list display control section 16 and the feed display control section 17 will be described with reference to FIG. 7.

The feed list display control section 16 is adapted to manage feed names 21a in feed information 21 in a hierarchical structure (folder structure) on the basis of folder names 21b, and to display as a feed list screen 16a on the feed display screen 15a.

In addition, the feed list display control section 16 is adapted to carry out a display control in accordance with an instruction from the user via the operation section 31, in the example depicted in FIG. 7, the feed name "Movie news" is selected in accordance with an instruction from the user via the operation section 31, as displayed in a highlight.

The feed display control section 17 is adapted to display update information 23 that is obtained by the obtainment execution section 13 and registered in the storage section 20 in a heading list window 17a and a browser window 17b on the feed display screen 15a.

As depicted in FIG. 7, the feed display control section 17 firstly displays update information 23 from a predetermined URL having a feed name 21a "Movie news" obtained by the obtainment execution section 13 in a list on the heading list window 17a.

In this example, a title, a creation date (update date), and a creator are displayed for each piece of update information 23.

The feed display control section 17 is also adapted to carry out a display control in accordance with an instruction from the user via the operation section 31, and displays details of the update information selected on the heading list window 17a (in this example, in the drawing, update information having a title of "TITLE 2" that is highlighted) 23 on the browser window 17b.

Note that, in the example depicted in FIG. 7, the example in which the display control section 15 (feed list display processing section 16 and feed display processing section 17) displays a single feed display screen 15a on the display section 18, the embodiment is not limited to a display by the display control section 15 of the example in FIG. 7.

For example, since the information processing apparatus 1 is a mobile telephone, the display control section 15 may display one of the feed list screen 16a, the heading list window 17a, and the browser window 17b one by one on the display section 18 if the display section 18 is small as depicted in FIG. 3.

More specifically, firstly, a feed list display processing section 16 only displays the feed list screen 16a on the display section 18, and in response to the user selecting a feed name while viewing this screen 16a, the feed display processing section 17 displays the heading list window 17a on the display section 18. In response to the user selecting a predetermined title while viewing this screen 16a, the feed display processing section 17 displays update information of the selected title on the browser window 17b. Thereby, the user can view desired update information 23 in a more reliable and visible manner even when the display section 18 is small.

Next, the operation procedure of the information processing apparatus 1 (that is, the processing procedure of an update information obtainment method as one embodiment) will be described with reference to the flowchart (Steps S1 to S9) depicted in FIG. 8.

Figure 8:
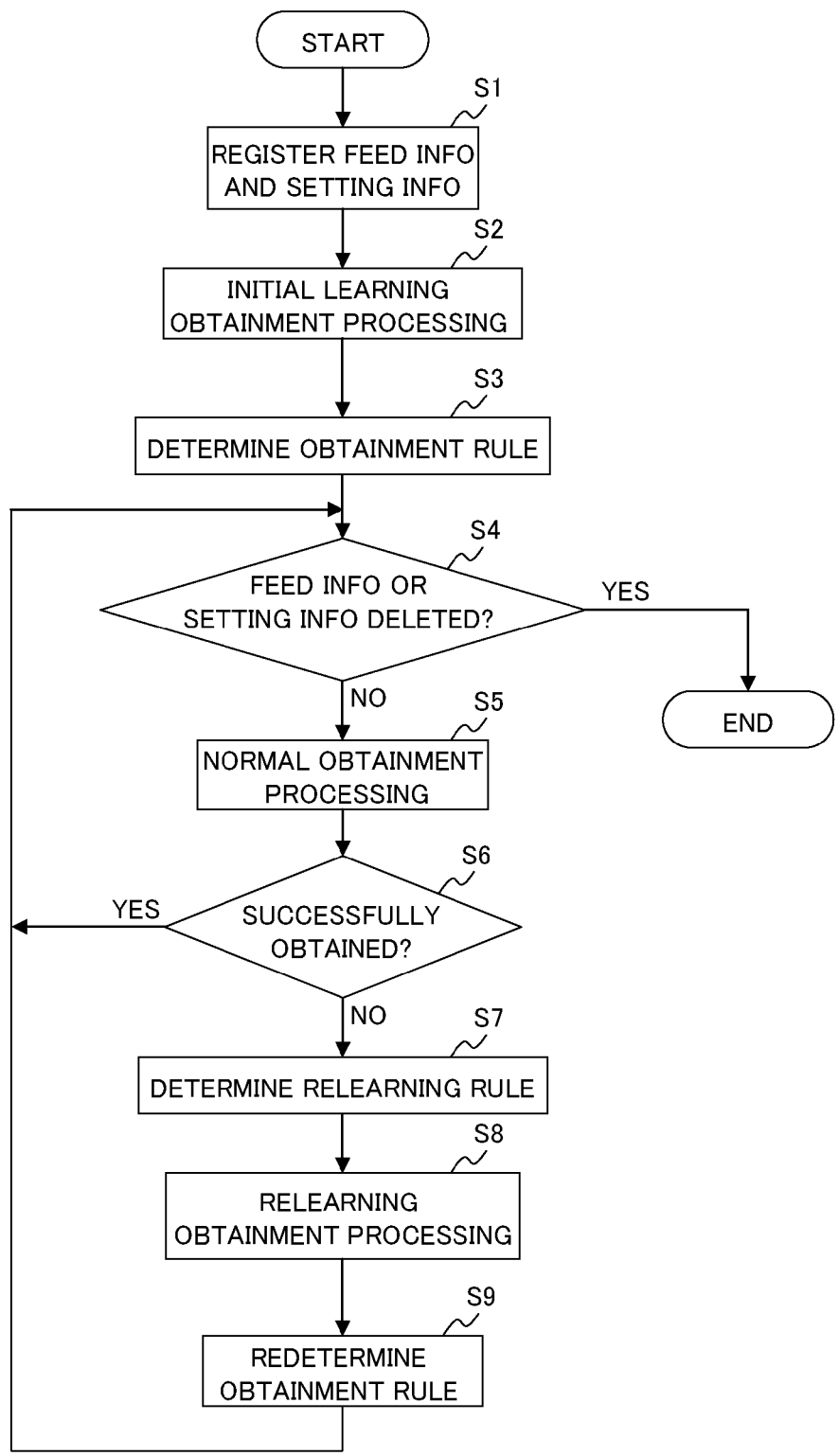
FIG. 8 is a flowchart illustrating the operation procedure of an update information obtainment method as one embodiment.

The operation procedure of the information processing apparatus 1 depicted in FIG. 8 is the operation procedure for a single distribution origin. Firstly, when feed information 21 and setting information 22 of the one distribution origin are registered by the user, or a periodic obtainment setting 22a in setting information 22 is set to "YES" (Step S1), on the basis of a learning rule (initial learning rule; in this example, a rule for periodically executing polling at every four hours from 0:00 each day until update information is obtained 20 times) preset by the obtainment execution section 13, initial learning obtainment processing is execute for obtaining update information from that distribution origin (learning obtainment step; Step S2).

After update information is obtained 20 times and the obtainment execution section 13 completes the initial learning obtainment processing, the obtainment rule determination section 12a determines an obtainment rule relating to a timing for obtaining update information for that distribution origin on the basis of an obtainment result thereof (determination step; Step S3). The obtainment rule determination section 12a registers the determined obtainment rule in the storage section 20 as setting information 22.

Then, if feed information 21 or setting information 22 related to this distribution origin is not deleted, or periodic obtainment setting 22a in the setting information 22 is not set to "NO" by the user (the NO route in Step S4), the obtainment execution section 13, on the basis of the obtainment rule determined by the obtainment rule determination section 12a, executes normal obtainment processing for regularly obtaining update information from that distribution origin (first normal obtainment step; Step S5).

Note if feed information 21 or setting information 22 related to this distribution origin is deleted, or periodic obtainment setting 22a in the setting information 22 is set to "NO" by the user (the YES route in Step S4), the information processing apparatus 1 terminates processing on that distribution origin.

Once the normal obtainment processing is executed by the obtainment execution section 13 (above Step S5), the relearning decision section 12b determines whether or not update information is successfully obtained by the obtainment execution section 13 on the basis of the result of this obtainment processing (decision step; Step S6).

Here, if the relearning decision section 12b determines that update information is not successfully obtained by the obtainment execution section 13 from that distribution origin (the NO route in Step S6), the obtainment rule determination section 12a determines a relearning rule corresponding to current obtainment rule on the basis of the table 12d (Step S7), and the obtainment execution section 13 executes relearning obtainment processing for obtaining update information on the basis of the determined predetermined relearning rule (first relearning obtainment step; Step S8).

Next, once the relearning obtainment processing by the obtainment execution section 13 is completed, the obtainment rule determination section 12a redetermines an obtainment rule on the basis of the obtainment result of the relearning obtainment processing (first redetermination step; Step S9), and the flow transitions to the processing of the above Step S4.

That is, if feed information or the like is not deleted by the user (the NO route in Step S4), the obtainment execution section 13 executes normal obtainment processing on the basis of the obtainment rule redetermined by the obtainment rule determination section 12a (second normal obtainment step; Step S5).

Note that, in the above Step S6, when the relearning decision section 12b determines that update information is successfully obtained by the obtainment execution section 13 from that distribution origin (the YES route in Step S6), the flow transitions to the processing of the above Step S4.

Next, detailed operation procedure by the obtainment execution section 13 for a plurality of distribution origins will be described with reference to the flowchart depicted in FIG. 9 (Steps S10 to S17).

The obtainment execution section 13 includes a startup timer (not shown), and processing is started in response to a start of this startup timer (Step S10).

The obtainment execution section 13 also includes a counter (not shown), in response to the start of the startup timer (Step S10), and the value k of the counter is initially set to 0 (Step S11).

Next, the obtainment execution section 13 counts up the value k of the counter to 1 (Step S12), and obtains setting information related to the feed corresponding to the value of the counter (No.) after the count-up in feed information 21 depicted in FIG. 4 (especially, obtainment timing 22c) (Step S13).

The obtainment execution section 13 then determines whether or not there is (is included) a timing in the obtained obtainment timings 22c which is matched to the current time indicated by a clock (not shown) in the information processing apparatus 1 (Step S14).

If there is a timing in the obtained obtainment timings 22c which is matched to the current time (the YES route in Step S14), the obtainment execution section 13 executes obtainment processing of update information for the distribution origin indicated by the feed information 21 (Step S15).

Note that if the obtainment execution section 13 determines that there is no obtainment timing identical to the current time in the above Step S14 (the NO route in Step S14), the obtainment execution section 13 skips the processing of the above Step S15.

Next, the obtainment execution section 13 determines whether or not the current value k of the counter is smaller than the number of distribution origin (the total count of feed information; five in the example in FIG. 4) in the feed information 21 (Step S16). If the value k of counter is smaller than the total number of distribution origin registered in feed information 21 (the YES route in Step S16), the obtainment execution section 13 transitions to the processing of the above Step S12.

On the other hand, the current value k of the counter becomes equal to the total number of distribution origin (the NO route in Step S16), the obtainment execution section 13, of obtainment timings 22c that has been obtained up to present (i.e., of all obtainment timings for all distribution origins of No. 1 to 5), sets the startup timer to the next periodic obtainment timing (that is, the time at which the next obtainment processing is to be executed) (Step S17), and the processing is terminated.

As described above, the obtainment execution section 13 can reliably execute obtainment processing of update information on the basis of the determined obtainment rule for all distribution origins that are set on the basis of feed information 21 and setting information 22 stored in the storage section 20.

Next, with reference to the flowchart depicted in FIG. 10 (Steps S20 to S30), the detailed operation procedure of the obtainment execution processing of update information for a single distribution origin by the obtainment execution section 13 in Step S15 in FIG. 9, and the operation procedure by the obtainment rule determination section 12a and the relearning decision section 12b in this step will be described in detail.

Figure 10:
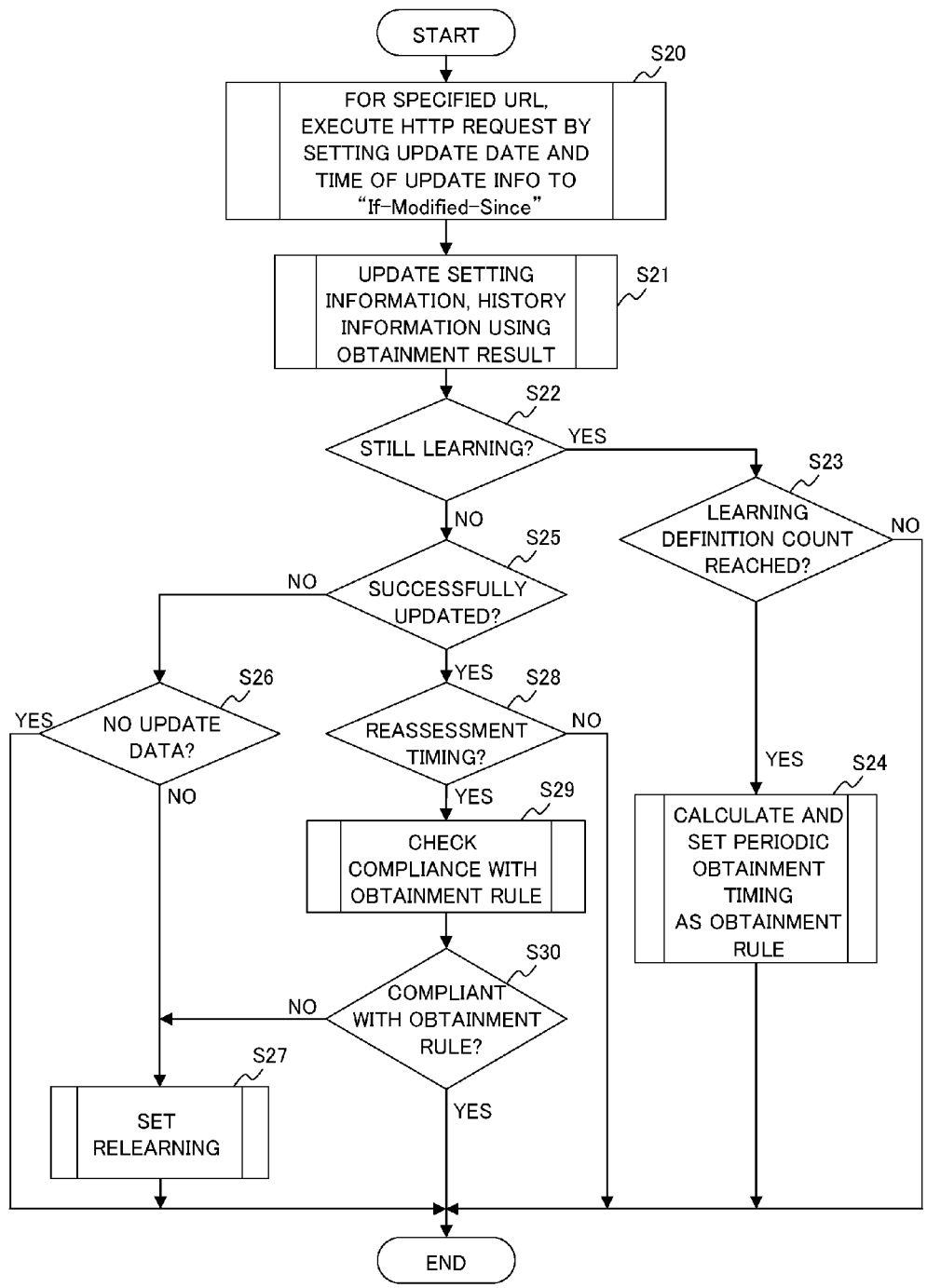
FIG. 10 is a flowchart illustrating the operation procedure of the feed obtainment processing section in the processing section in an information processing apparatus as one embodiment.

As depicted in FIG. 10, the obtainment execution section 13, upon executing obtainment processing of update information from a single distribution origin, firstly executes, using the communication section 14, an HTTP request in which the update date and time 22d is set to "If-Modified-Since" for the URL 21c indicating that single distribution origin (Step S20).

Thereby, if there is update information of the latest update date and time than the update date and time 22d in the URL 21, the obtainment execution section 13 obtains the update information, and modifies the setting information 22 and the history information 24 with the obtainment result.

That is, the obtainment execution section 13 updates the update date and time 22d to the update date and time in the obtained update information, and updates the obtainment execution time 24a, the obtainment status 24b, and the content update time 24c in history information 24 on the basis of the obtained update information (Step S21).

Thereafter, when the update processing by the obtainment execution section 13 is terminated, it is determined whether or not the obtainment rule determination section 12a is currently learning (that is, the obtainment execution section 13 is executing processing on the basis of the learning rule) (Step S22). If learning is currently performed (the YES route in Step S22), the obtainment rule determination section 12a determines whether or not the learning definition count defined by the learning rule (20 times in this example) is reached with the last update processing (Step S23).

If the learning definition count is not reached yet (the NO route in Step S23), the obtainment execution section 13 and the obtainment rule determination section 12a terminates the processing.

On the other hand, if the learning definition count is reached (the YES route in Step S23), the obtainment rule determination section 12a calculates and sets a periodic obtainment timing as the obtainment rule on the basis of the compliance rule 12e and the setting timing 12f in the table 12d as described above (Step S24), and the processing is terminated.

In addition, when no learning is performed and it is determined that the obtainment rule determination section 12a is not learning in the above Step S22 (the NO route in Step S22), the relearning decision section 12b determines whether or not update information is successfully obtained (successfully updated) by the obtainment execution section 13 on the basis of the history information 24 updated at the above Step S21 (Step S25).

When it is determined that update information is not successfully obtained (the NO route in Step S25), the relearning decision section 12b determines whether or not the reason is that no update information is available at the distribution origin (Step S26). More specifically, the relearning decision section 12b determines whether or not the status code in the HTTP response received from the distribution origin through the communication section 14 indicates that there is no new update information ("304 Not Modified").

When the relearning decision section 12b determines that the cause of update failure is not that there is no update information (for example, the cause is a communication failure, such as interruption of radio waves or detection of a timeout) (the YES route in Step S26), and the processing is terminated.

On the other hand, when the relearning decision section 12b determines the cause of update failure is that there is no update information (the NO route in Step S26), relearning is set so as to make the obtainment execution section 13 to execute relearning (that is, a relearning rule corresponding to the current obtainment rule is set to the setting information 22) (Step S27), and the processing is terminated.

In addition, when the relearning decision section 12b determines that update information is successfully updated by the obtainment execution section 13 at the above Step S25 (the YES route in Step S25), it determines whether or not the present is a reassessment timing (Step S28).

Note that the reassessment timing is the timing at which the determination as to whether or not is executed is made, and the relearning decision section 12b determines as a reassessment timing after the obtainment execution section 13 executes a normal operation (processing on the basis of an obtainment rule) for a predetermined time period (for example, until update information is obtained 20 times) and determines whether or not it makes the obtainment execution section 13 to execute relearning.

More specifically, the relearning decision section 12b includes a counter (not shown) and increments the counter in response to the history information 24 being updated by the obtainment execution section 13 (that is, update information is successfully obtained) and determines as a reassessment timing when the counter reaches to a certain value. Note that the relearning decision section 12b resets the counter after learning is completed and relearning is completed.

When the relearning decision section 12b does not determine as a reassessment timing (the NO route in Step S28), the processing is terminated.

On the other hand, when the relearning decision section 12b determines as a reassessment timing (the YES route in Step S28), it is checked whether or not the update date and time (content update time) 24c at the distribution origin of the obtained update information is compliant with the obtainment rule that is adapted by the obtainment execution section 13 on the basis of the history information 24 (Step S29). More specifically, the relearning decision section 12b checks whether or not the latest update information at the current obtainment timing is obtained at an appropriate timing, similar to the determination of an obtainment rule by the obtainment rule determination section 12a.

When the relearning decision section 12b determines that the obtained update information is compliant with the obtainment rule (the YES route in Step S29), the processing is terminated.

On the other hand, when the relearning decision section 12b determines that the obtained update information is not compliant with the obtainment rule (the NO route in Step S29), relearning is set so as to make the obtainment execution section 13 to execute relearning (that is, a relearning rule corresponding to the current obtainment rule is set to the setting information 22) (Step S27), and the processing is terminated.

Accordingly, when the relearning decision section 12b determines as reassessment timing, assuming that the obtainment execution section 13 executes update processing on the basis of an obtainment rule for obtaining at 12:00 each day, for example. When information has been updated at around 10:30 each day at a distribution origin so far but now information is update at around 7:30 each day, it is desired that the obtainment execution section 13 execute obtainment processing at 8:00 every day in order to perform more effective processing. In such a case, the obtainment execution section 13 can determine that the update date and time of the distribution origin is not compliant with the obtainment rule that is being adapted and a more appropriate obtainment rule can be reset by executing relearning.

Figure 11:
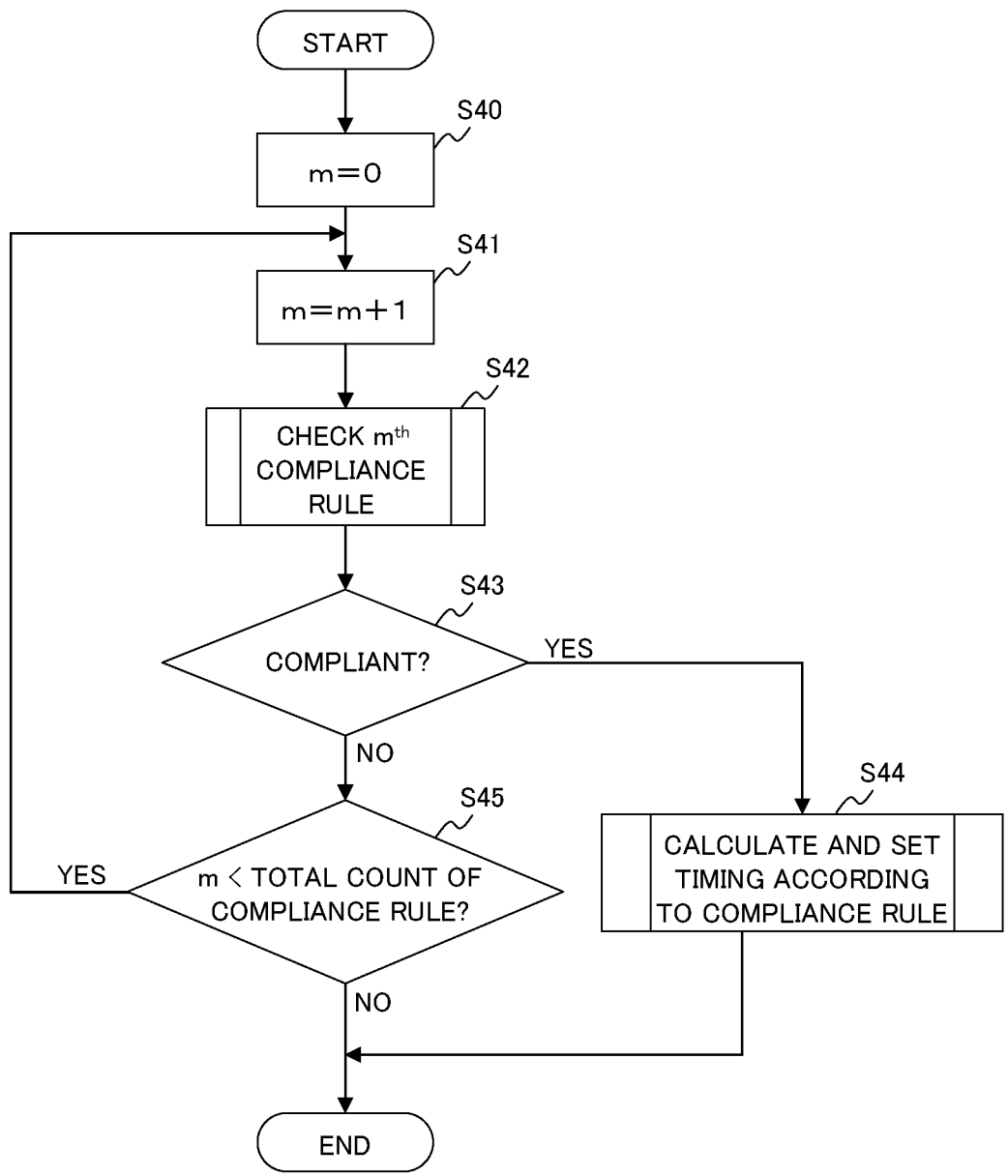
FIG. 11 is a flowchart illustrating the operation procedure of an obtainment rule determination section in a schedule processing section in the feed obtainment processing section of processing section in an information processing apparatus as one embodiment.

Next, the determination of an obtainment rule by the obtainment rule determination section 12a (that is, specific operation procedures of Steps S3 and S7 in FIG. 9, and Step S24 in FIG. 10 described above) will be described in detail with reference to the flowchart depicted in FIG. 11 (Steps S40 to S45).

The obtainment rule determination section 12a includes a counter (not shown), and upon determining an obtainment rule, initially resets the value m of the counter to 0 (Step S40).

Next, the obtainment rule determination section 12a counts ups the value m of the counter by one (Step S41), and for compliance rule 12e for the value m of the counter after the count-up in the table 12d depicted in FIG. 6, determines whether or not the obtainment result of the obtainment execution section 13 in the history information 24 is compliant (Step S42).

When the obtainment rule determination section 12a determines as compliant (YES route in Step S43), it calculates an obtainment timing that is compliant with the compliance rule in accordance with the setting timing 12f corresponding to that compliance rule 12e, registers it to setting information 22 in the storage section 20 as an obtainment rule (Step S44), and terminates the processing.

On the other hand, when the obtainment rule determination section 12a does not determine as compliant (the NO route in Step S43), it determines whether or not the value m of the counter is smaller than the total number of compliance rules 12e in the table 12d (eight in the example of FIG. 6) (Step S45). When the value m of the counter is smaller than the total number of compliance rules 12e (the YES route in Step S45), the obtainment rule determination section 12a transitions to the processing of the above-described Step S41.

On the other hand, current value m of the counter becomes equal to the total number of compliance rules 12e (the NO route in Step S45), the obtainment rule determination section 12a terminates the processing.

Accordingly, it is assured that the obtainment rule determination section 12a can determine an obtainment rule in accordance with the priority that is set in advance to a compliance rule 12e on the basis of the table 12d.

As described above, according to the information processing apparatus 1 and the update information obtainment method as one embodiment, the obtainment execution section 13 obtains update information on the basis of a preset predetermined learning rule for a distribution origin the obtainment rule of which is not determined by the obtainment rule determination section 12a yet. The obtainment rule determination section 12a determines an obtainment rule for a distribution origin on the basis of an obtainment result by the obtainment execution section 13 of update information from the distribution origin on the basis of the learning rule. In response to a determination of an obtainment rule by the obtainment rule determination section 12a, the obtainment execution section 13 regularly obtains update information from that distribution origin on the basis of the obtainment rule. Thus, the obtainment execution section 13 can effectively obtain update information from the distribution origin on the basis of the obtainment rule to which the learning result is reflected.

Accordingly, even if the information processing apparatus 1 is used in a system in which the user is charged in accordance with the data communication amount or time, the user can prevent an expensive communication fee from being charged since update information can be efficiently obtained using an obtainment rule in accordance with the a learning result.

In addition, the communication section 14 accesses to the network 2 via a wireless communication network using the antenna 14a in the information processing apparatus 1. In this case, since update processing is efficiently executed, the information processing apparatus 1 becomes resistant to troubles (such as communication failures due to network overload) of a wireless network.

Furthermore, the information processing apparatus 1 is a mobile terminal and is operated on a power supply from a battery (not shown). Accordingly, fast consumption of power from battery can be prevented by executing update processing efficiently and thus saving power consumption.

In addition, the obtainment execution section 13, in response to determination that update information is not obtained by the relearning decision section 12b from the distribution origin and thus relearning is required, obtains update information from the distribution origin on the basis of a predetermined relearning rule. The obtainment rule determination section 12a redetermines an obtainment rule on the basis of an obtainment result of update information by the obtainment execution section 13 from the distribution origin on the basis of the relearning rule. The obtainment execution section 13 regularly obtains update information from the distribution origin on the basis of the obtainment rule redetermined by the obtainment rule determination section 12a. Thus, even when the time to update information at the distribution origin is changed and the adapted obtainment rule becomes not compliant with update of information at the distribution origin any more, for example, the obtainment execution section 13 can execute more reliably and efficiently obtainment processing of update information by execute the obtainment processing of the update information on the basis of a new obtainment rule according to the relearning result.

In addition, the relearning decision section 12b determines that update information is not successfully obtained by the obtainment execution section 13 (that is, relearning is required) when the obtainment execution section 13 cannot obtain update information since no update information is available at the distribution origin. Thus, it is possible to execute relearning only when a obtainment rule becomes not compliant with update at the distribution origin anymore, and thus execution of wastefully relearning when update information cannot be obtained due to a communication failure, for example, can be obtained.

Furthermore, a relearning rule upon relearning is determined in accordance with the obtainment rule before redetermination by the obtainment rule determination section 12a (that is, the obtainment rule when relearning is required by the relearning decision section 12b). Thus, effective relearning can be executed, and thus relearning can be carried out swiftly without wastefully increasing power consumption.

In addition, the obtainment rule determination section 12a determines, as an obtainment rule, a rule corresponding to an obtainment result of update information by the obtainment execution section 13. Thus, it is possible to reliably determine an obtainment rule corresponding to update timing of information at the distribution origin from a plurality of prestored rules (compliance rule 12e and setting timing 12f) as depicted in the table 12d in FIG. 6. As a result, it is possible to efficiently execute obtainment processing of update information.

Furthermore, the obtainment rule determination section 12a searches a plurality of rules for among a rule corresponding to an obtainment result by the obtainment execution section 13 in order of priority that is set for each of the plurality of rules, and determines, when a corresponding rule is found, the rule as an obtainment rule. Thus, it is possible to determine an obtainment rule in accordance with a preset priority, and to determine an obtainment rule that is more fitted to the update timing of information at the distribution origin. As a result, it is possible to efficiently execute obtainment processing of update information.

In addition, since the setting section 12c sets the priority that is used by the obtainment rule determination section 12a for searching a plurality of rules for a rule corresponding to an obtainment result by the obtainment execution section 13, it is possible to determine an obtainment rule that reflects the user's preference.

(2) Others

Note that the embodiment is not restricted to the embodiment described above, and various modifications may be made without departing from the spirit of the embodiment.

Although the above-described embodiment has been described with reference to the example in which the information processing apparatus 1 is a mobile terminal connecting to the network 2 using a wireless network, the embodiment is not limited to this example and the information processing apparatus 1 may be a terminal (for example, personal computer) connecting to the network 2 using a wired network.

In addition, the above-described embodiment has been described with reference to the example in which a distribution origin of update information is an HTTP server 3, a distribution origin of update information is not limited in the embodiment.

Furthermore, the above-described embodiment is configured such that the relearning decision section 12b determines that relearning is required when update information is not obtained successfully by the obtainment execution section 13. The embodiment is not limited to this, and it may be configured such that the relearning decision section 12b determines that relearning is required when a predetermined time period (for example, one month) elapses.

In this case, it may be configured such that the obtainment execution section 13 obtains update information from the distribution origin on the basis of a predetermined relearning rule when a predetermined time that is preset period elapse after an obtainment rule is determined by the obtainment rule determination section 12a (second relearning obtainment step), the obtainment rule determination section 12a redetermines an obtainment rule on the basis of an obtainment result by the obtainment execution section 13 of update information from the distribution origin on the basis of the relearning rule (second redetermination step), and the obtainment execution section 13, when an obtainment rule is redetermined by the obtainment rule determination section 12a, obtains update information from the distribution origin on the basis of the redetermined obtainment rule (third normal obtainment step).

Thereby, since it assured that relearning is executed after a predetermined time period elapses, even when the update timing of update information at the distribution origin becomes not conform to the obtainment rule any more. Thus, it is possible to reliably redetermine an optimum obtainment rule in accordance with the relearning result after the predetermined time period elapses. As a result, the obtainment execution section 13 can more efficiently execute obtainment processing of update information.

In addition, although the above-described embodiment is configured such that the relearning decision section 12b determines as reassessment timing when the obtainment execution section 13 execute normal operation until update information is obtained 20 times (see Step S28 in FIG. 10), the embodiment is not limited to this. It may be configured such that when a predetermined time (for example, one month) elapses, reassessment timing after the obtainment execution section 13 commences a normal operation (that is, after the obtainment rule determination section 12a determines an obtainment rules), for example. Thereby, the same advantageous effect as those of the above-described embodiment may be achieved.

Note that the above-described embodiment has been described with reference to the example in which an obtainment rule, a learning rule, and a relearning rule makes update processing to be executed at four-hour unit times (at 0:00, 4:00, 8:00, 12:00, 16:00, and 20:00) from 0:00. However, the timing at which each rule makes update processing to be executed is not limited to a certain timing in the embodiment, and the user may set the timing.

In addition, in the embodiment, the compliance rule 12e and the setting timing 12f indicated in FIG. 6, i.e., obtainment rules determined by the obtainment rule determination section 12a are not limited to the above-described embodiment. Various rules may be modified or combined, such as rules for obtaining in mornings (12:00) or afternoons (0:00), or days of week (for example, day-offs) or time (commuting time or working time) during which the user cannot view (or does not view) the update information or during which update processing is not executed, for example.

Furthermore, the setting section 12c may be configured to be able to modify obtainment rules determined by the obtainment rule determination section 12a in accordance with an instruction from the user via the operation section 31. For example, it may be configured such that, for obtainment rules determined by the obtainment rule determination section 12a, time periods, such as days of week (for example, day-offs) or time (commuting time or working time), during which the user cannot view (or does not view) update information may be set. Thereby, the convenience for the user can be improved and more effective obtainment processing of update information may be possible.

In addition, although the above-described embodiment is configured such that processing is terminated when the relearning decision section 12b determines that failed update is caused by absence of update information in Step S26 in FIG. 10 (the YES route in Step S26), the embodiment is not limited to this. It may be configured such that a sequence to execute obtainment processing of update information again is executed when such a cause is a communication failure (for example, when radio waves are out of range or when a timeout is detected) and a temporary reason, for example. Thereby, update information can be more reliably obtained.

Note that the relearning decision section 12b determines that the cause is a temporary cause if the status code of the HTTP response is not a one indicating a permanent cause ("404 Not Found").

Furthermore, the above-described embodiment has been described with reference to the example in which the obtainment rule determination section 12a determines an obtainment rule on the basis of the table 12d depicted in FIG. 6, the embodiment is not limited to this. It may be configured such that the setting section 12c sets a communication efficiency-oriented mode or update reflection rate-oriented mode in accordance with an instruction from the user, and that the obtainment rule determination section 12a determines an obtainment rule in accordance with the mode that is set.

More specifically, the reflection rate-oriented mode is the mode in which update processing is executed in response to update of information at a distribution origin, wherein the obtainment rule determination section 12a determines an obtainment rule on the basis of the table 12d in FIG. 6, as described above. When the communication efficiency-oriented mode is set by the user, the obtainment rule determination section 12a determines an obtainment rule in accordance with a rule set in accordance with that mode, such as for updating once a day or once a week.

For example, when the obtainment execution section 13 obtains update information at 3:00 and 7:00 everyday when learning, the obtainment rule determination section 12a determines an obtainment rule for updating at 8:00 everyday which is the four-hour unit time corresponding to 7:00 which is the latest update time when the communication efficiency-oriented mode is set.

In addition, when the obtainment execution section 13 obtains update information everyday from Monday to Friday upon learning, the obtainment rule determination section 12a determines an obtainment rule for executing update processing at the corresponding time on Friday in one week when communication efficiency-oriented mode.

Thereby, the user can set the communication efficiency-oriented mode when the used wishes to save the communication fee while setting the update reflection rate-oriented mode when the user wishes to obtains update information actively. Thus, the convenience for the user can be improved.

Note that the functions of the feed processing section 11 and the display control section 15 in the above-described the processing section 10, i.e., the obtainment rule determination section 12a, the relearning decision section 12b, and the setting section 12c in the schedule processing section 12, and the obtainment execution section 13, and furthermore, the feed list display processing section 16 and feed display processing section 17 may be embodied by a computer (including a CPU, an information processing apparatus, various types of terminals) executing a predetermined application program (update information obtainment program).

Such a program is provided in the form of a record on computer readable storage medium, for example, a flexible disk, CDs (such as a CD-ROM, CD-R, a CD-RW), DVDs (such as a DVD-ROM, a DVD-RAM, a DVD-R, a DVD-RW, a DVD+R, a DVD+RW). In this case, the computer reads an update information program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer via a communication line.

Here, the term "computer" may be a concept including hardware and an OS (operating system), and may refer to hardware that operates under the control of the OS. Alternatively, when an application program alone can make the hardware to be operated without requiring an OS, the hardware itself may represent a computer. The hardware may include, at least a microprocessor, such as a CPU, and means to read a computer program stored on a storage medium.

The application program as the above-described update information obtainment program includes program codes for making the computer to embody the function of the obtainment rule determination section 12a, the relearning decision section 12b, the setting section 12c, the obtainment execution section 13, the feed list display processing section 16, and the feed display processing section 17. In addition, a part of the functions may be embodied by the OS, rather than the application program.

Furthermore, as the storage medium in this embodiment, other than a flexible disk, a CD, a DVD, a magnetic disk, an optical disk, or a magneto-optical disk, an IC card, a ROM cartridge, a magnetic tape, a punch card, an internal storage device (memory, such as a RAM: or ROM) of the computer, an external storage device or the like, or any medium that is readable by the computer, including a printed medium having a code, such as a bar code, is printed thereon, may be used.

As described above, according to the embodiment, the obtainment section efficiently obtains update information from a distribution origin on the basis of the obtainment rule to which the learning result that is determined by the determination section is determined. Thus, even when the user is charged in accordance with data communication amount or time, it is possible to prevent an expensive communication fee from being charged to the user since update information is efficiently obtained using an obtainment rule in accordance with the learning result. In addition, even when a network is accessed through a wireless communication network, the network becomes resistant to troubles of the wireless network (such as communication failures due to network overload). Furthermore, even when operating on power supplied from a battery, power consumption can be saved by efficiently executing update processing, thereby preventing the battery power from being consumed in a shorter time.

Furthermore, the obtainment section obtains update information from the distribution origin on the basis of the obtainment rule redetermined by the determination section. Thus, even when the time to update information at the distribution origin is changed and the adapted obtainment rule becomes not compliant with update of information at the distribution origin any more, for example, the obtainment section can execute more reliably and efficiently obtainment processing of update information by execute the obtainment processing of the update information on the basis of a new obtainment rule according to the relearning result.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:
1. An information processing apparatus comprising:
an obtainment section that obtains, via a network, information updated at a distribution origin on the network;
a determination section that determines an obtainment rule relating to a timing of the obtainment by the obtainment section of update information for the distribution origin; and
a decision section that determines whether or not update information is successfully obtained by the obtainment section from the distribution origin on the basis of a result of the obtainment by the obtainment section of update information from the distribution origin on the basis of the obtainment rule;
wherein the obtainment section obtains update information on the basis of a predetermined learning rule for a first distribution origin for which obtainment rule has not been determined by the determination section,
the determination section determines an obtainment rule for the first distribution origin on the basis of a result of the obtainment by the obtainment section of update information from the distribution origin on the basis of the learning rule,
the obtainment section, in response to the determination of the obtainment rule by the determination section, obtains update information from the first distribution origin on the basis of the obtainment rule,
the obtainment section, in response to the determination by the decision section that update information is not successfully obtained from the distribution origin, obtains update information from the distribution origin on the basis of a predetermined relearning rule,
the determination section redetermines the on the basis of the obtainment rule a result of the obtainment by the obtainment section of update information from the distribution origin on the basis of the relearning rule, and
the obtainment section, in response to the redetermination of the obtainment rule by the determination section, obtains update information from the distribution origin on the basis of the redetermined obtainment rule.

2. The information processing apparatus according to claim 1, wherein the decision section determines that update information is not successfully obtained by the obtainment section when the obtainment section cannot obtain update information.

3. The information processing apparatus according to claim 2, wherein the relearning rule is determined according to the obtainment rule before the redetermination by the determination section.

4. The information processing apparatus according to claim 1, wherein
the obtainment section obtains update information from the distribution origin on the basis of a predetermined relearning rule after a predetermined time period elapses after the obtainment rule is determined by the determination section,
the determination section redetermines the obtainment rule on the basis of a result of the obtainment by the obtainment section of update information from the distribution origin on the basis of the relearning rule, and
the obtainment section, in response to the redetermination of the obtainment rule by the determination section, obtains update information from the distribution origin on the basis of the redetermined obtainment rule.

5. The information processing apparatus according to claim 4, wherein the relearning rule is determined according to the obtainment rule before the redetermination by the determination section.

6. The information processing apparatus according to claim 1, wherein the determination section determines, as the obtainment rule, a rule corresponding to a result of the obtainment by the obtainment section of update information among a plurality of prestored rules.

7. The information processing apparatus according to claim 6, wherein the determination section searches the plurality of rules for a rule corresponding to the result of the obtainment by the obtainment section in order of priorities set for each of the plurality of rules, and determines, in response to identification of a corresponding rule, that rule as the obtainment rule.

8. The information processing apparatus according to claim 7, further comprising a setting section that sets the priorities used when searching the plurality of rules for a rule corresponding to the result of the obtainment by the obtainment section.

9. An update information obtainment method that obtains, via a network, information updated at a distribution origin on the network, the method comprising:
- performing a learning obtainment that obtains update information from the distribution origin on the basis of a predetermined learning rule;
- performing a determination that determines an obtainment rule relating to an obtainment timing of update information for the distribution origin on the basis of a result of the obtainment at the learning obtainment of update information from the distribution origin;
- performing a first normal obtainment that obtains update information from the distribution origin on the basis of the obtainment rule determined at the determination;
- performing a decision that determines whether or not update information is successfully obtained at the first normal obtainment on the basis of a result of the obtainment result at the first normal obtainment of update information from the distribution origin on the basis of the obtainment rule;
- performing a first relearning obtainment that obtains, in response to the determination at the decision that update information from the distribution origin is not successfully obtained at the first normal obtainment, update information on the basis of a predetermined relearning rule;
- performing a first redetermination that redetermines the on the basis of the obtainment rule a result of the obtainment at the first relearning obtainment of update information from the distribution origin; and
- performing a second normal obtainment that obtains update information from the distribution origin on the basis of the obtainment rule redetermined at the first redetermination.

10. The update information obtainment method according to claim 9, wherein the decision determines that update information is not successfully obtained at the first normal obtainment when update information cannot be obtained at the first normal obtainment.

11. The update information obtainment method according to claim 9, wherein the relearning rule is determined according to the obtainment rule before the redetermination at the first redetermination.

12. The update information obtainment method according to claim 9, further comprising:
- performing a second relearning obtainment that obtains information from the distribution origin on the basis of a predetermined relearning rule after a predetermined time period elapses after the obtainment rule is determined at the determination;
- performing a second redetermination that redetermines the on the basis of the obtainment rule a result of the obtainment at the second relearning obtainment of update information from the distribution origin on the basis of the relearning rule; and
- performing a third normal obtainment that obtains, in response to the redetermination of the obtainment rule at the second redetermination, update information from the distribution origin on the basis of the redetermined obtainment rule.

13. The update information obtainment method according to claim 12, wherein the relearning rule is determined according to the obtainment rule before the redetermination at the second redetermination.

14. The update information obtainment method according to claim 9, wherein a rule corresponding to a result of the obtainment at the learning obtainment of update information is determined, as the obtainment rule, among a plurality of prestored rules at the determination.

\* \* \* \* \*